United States Patent [19]
Webber

[11] 3,953,272
[45] Apr. 27, 1976

[54] PROCESS FOR END SEALING A BAG AND APPARATUS THEREFOR

[75] Inventor: Geoffrey Terence Webber, Bristol, England

[73] Assignee: Whitehall Machinery Limited, Bristol, England

[22] Filed: May 15, 1974

[21] Appl. No.: 470,293

[30] Foreign Application Priority Data
May 16, 1973 United Kingdom............... 23438/73

[52] U.S. Cl.................................. 156/152; 53/39;
53/373; 93/35 R; 156/87; 156/217; 156/286;
156/306; 156/322; 156/461; 156/484;
156/497; 156/499; 156/582; 264/90
[51] Int. Cl.².................................. B32B 31/20
[58] Field of Search ............ 156/497, 498, 499, 82,
156/156, 200, 217, 285, 286, 287, 304, 306,
322, 461, 484, 485, 87; 264/80, 90, 92;
239/13, 135, 504; 53/28, 34, 39, 179, 371,
373; 93/35 R, 33 HT

[56] References Cited
UNITED STATES PATENTS

| | | |
|---|---|---|
| 2,632,921 | 3/1953 | Kreidl .................................. 156/82 |
| 2,680,332 | 6/1954 | Young .................................. 156/82 |
| 3,210,227 | 10/1965 | Shichman ........................... 156/82 |
| 3,486,955 | 12/1969 | Paabo ................................. 156/82 |
| 3,554,828 | 1/1971 | Schmedding et al. .............. 156/156 |
| 3,582,430 | 6/1971 | Benigno ............................... 156/82 |
| 3,717,538 | 2/1973 | Hartung.............................. 156/497 |
| 3,734,803 | 5/1973 | Lipscomb et al. .................. 156/497 |
| 3,855,037 | 12/1974 | Imhagen et al. ..................... 156/497 |

*Primary Examiner*—Edward G. Whitby
*Attorney, Agent, or Firm*—Cushman, Darby & Cushman

[57] ABSTRACT

Superimposed heat-sealable layers are heat-sealed by applying external suction to draw the layers apart, inserting a nozzle between the parted layers, directing hot gas from the nozzle onto the inside surfaces of the layers, removing the nozzle and pressing the heated surfaces together. Preferably the layers are carried by a conveyor, such as between a pair of endless chains, along a path on which the suction means, nozzle means and pressing means are successively arranged.

7 Claims, 7 Drawing Figures

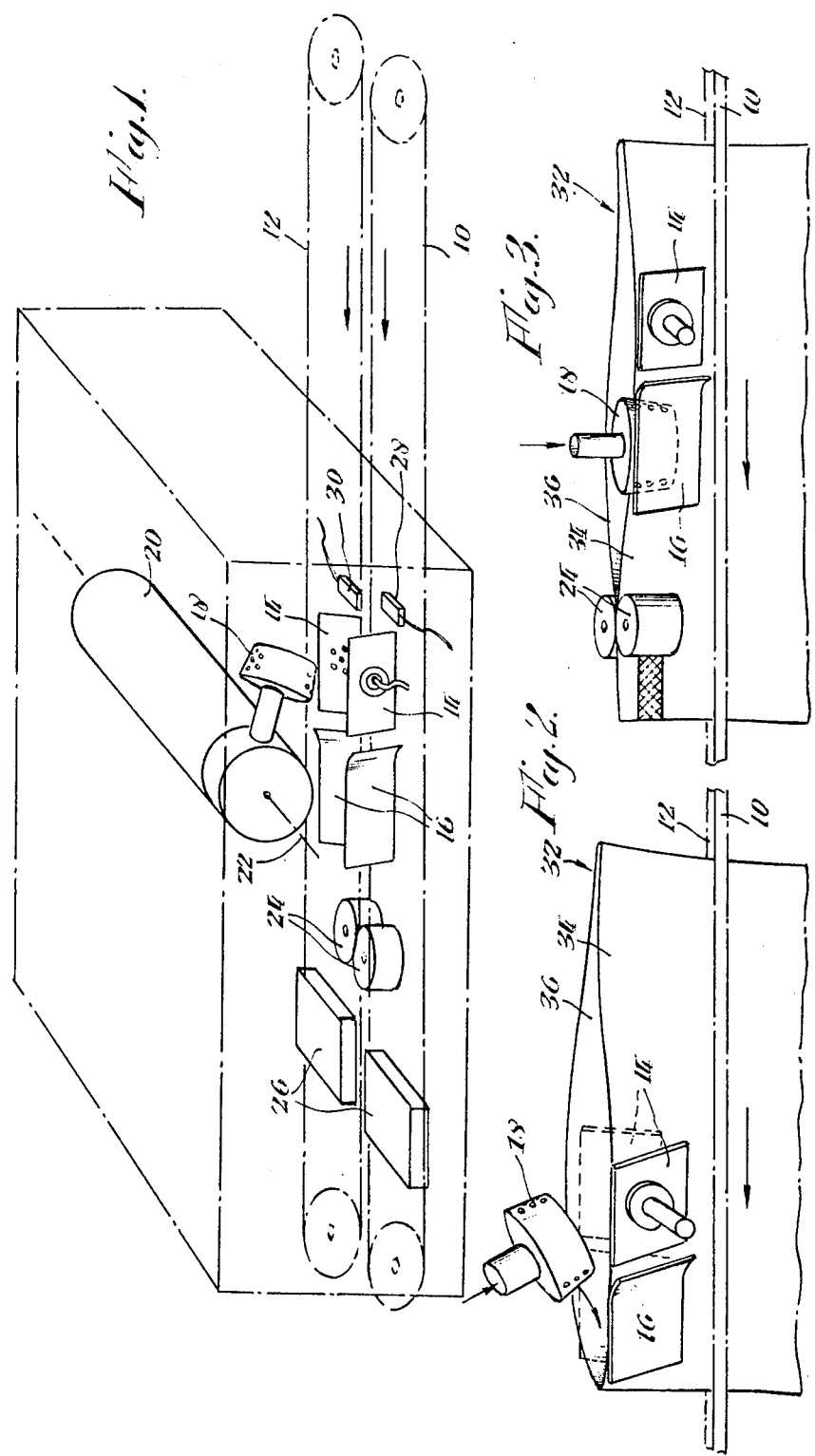

PROCESS FOR END SEALING A BAG AND APPARATUS THEREFOR

FIELD OF THE INVENTION

This invention relates to heat-sealing of superimposed layers of sheet material, and is especially applicable to the heat-sealing of the mouths of bags or sacks (herein referred to generally as sacks).

BACKGROUND TO THE INVENTION

Conventional heat-sealing processes usually involve pressing together the surfaces to be sealed followed by the external application of heat. This is conventionally effected by gripping the superimposed layers between a pair of reciprocating heated jaws, or by passing the superimposed layers between a pair of rotating heat-seal bars, or by carrying the superimposed layers between two moving endless metal bands which pass between stationary heated members (a band sealer). In each case, the heat has to pass through the sheet material to reach the contacting surfaces and effect the seal. In the case of thick materials this can result in long dwell times, and even deterioration of the outer surfaces before the inner surfaces are brought to the correct temperature. A further problem is that of ensuring that the contacting surfaces are clean, particularly if the heat-seal is being effected at the mouth of a sack containing powdery material, since it is virtually impossible to ensure that the mouth region of the sack is not contaminated by the powder during filling. To overcome this latter problem a rotary suction device has been proposed for cleaning sack mouths prior to heat-sealing by conventional means.

SUMMARY OF THE INVENTION

According to one aspect of the present invention there is provided apparatus for heat-sealing a pair of superimposed heat-sealable layers of sheet material, comprising suction means for drawing the layers apart along one longitudinal edge portion, nozzle means adapted to introduce a nozzle into the open mouth between the parted layers, to direct heated gas therefrom onto the inner surfaces of the layers along the region to be heat-sealed, and thereafter to remove the nozzle from between the layers, and means for pressing the layers together in the heated region to effect a heat-seal between the layers.

The heat-sealable layers may be the opposite panels of a sack. In such a form, the nozzle is preferably arranged to direct at least the major part of the heated gas forwardly and rearwardly in the direction of travel of the material, so that sufficient heat is directed into the end folds to allow an effective heat-seal at these folds.

According to another aspect of the present invention there is provided a method of heat-sealing superimposed heat-sealable layers of sheet material which comprises the steps of:

i. applying suction means to the outside surfaces of the layers so as to draw them apart in the region to be heat-sealed;

ii. introducing a nozzle between the parted layers, directing heated gas therefrom onto the inner surfaces of the layers so as to bring them into a heat-sealable state, and then removing the nozzle; and iii. pressing the heated surfaces together to effect the heat-seal.

BRIEF DESCRIPTION OF THE DRAWINGS

In order that the invention may be more clearly understood, one embodiment will now be described with reference to the accompanying diagrammatic drawings, wherein:

FIG. 1 shows schematically the general lay-out of a suitable heat-sealing machine for sack mouths, FIG. 2 shows a sack mouth at the start of the heat-sealing process, FIG. 3 shows the sack mouth in the course of heat-sealing.

DESCRIPTION OF PREFERRED EMBODIMENTS

Figure 4:
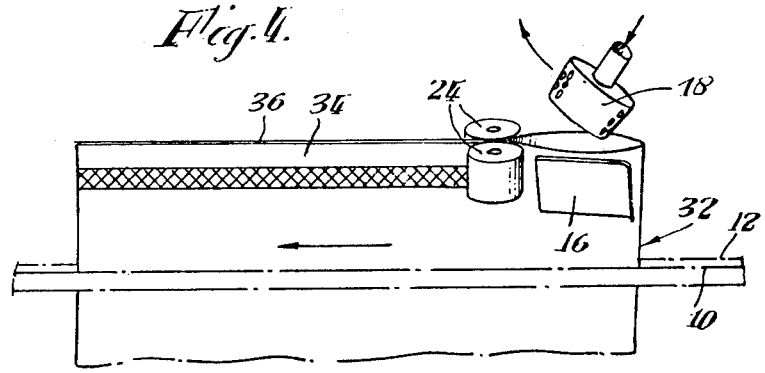
FIG. 4 shows the sack mouth towards the end of the heat-sealing.

Referring to the drawings, and firstly to FIG. 1; the apparatus comprises a pair of endless chains 10, 12, driven by suitable means (not shown), and arranged in a horizontal plane so as to pass in face-to-face relationship over part of their run (herein called the working run). These chains are provided with pressure elements so as to grip, in known manner, the mouth of a sack and support the sack in transporting it through the heat-sealing apparatus. The principal elements which effect the heat-sealing are, in sequence, a pair of suction devices 14 arranged on opposite sides of the working run and connected to a suitable source of vacuum (not shown), a pair of external support plates 16 on each side of the working run, a nozzle 18 supplied with hot air from a heater 20 which is connected to a suitable blower or compressed air supply (not shown), the nozzle being rotatable about a horizontal axis 22 extending transversely to the direction of the working run so that it can be brought in to and out of the region between the support plates 16, a pair of nip rolls 24, and, if required, a pair of cooling elements 26. Also, there are a pair of micro-switch elements 28, 30, located just before the suction elements 14, so as to sense the beginning and end respectively of the sack mouth and cause rotation of the nozzle in to and out of the region between the support plates 16. All these components are assembled on a suitable supporting frame (not shown).

Figures 5, 6:
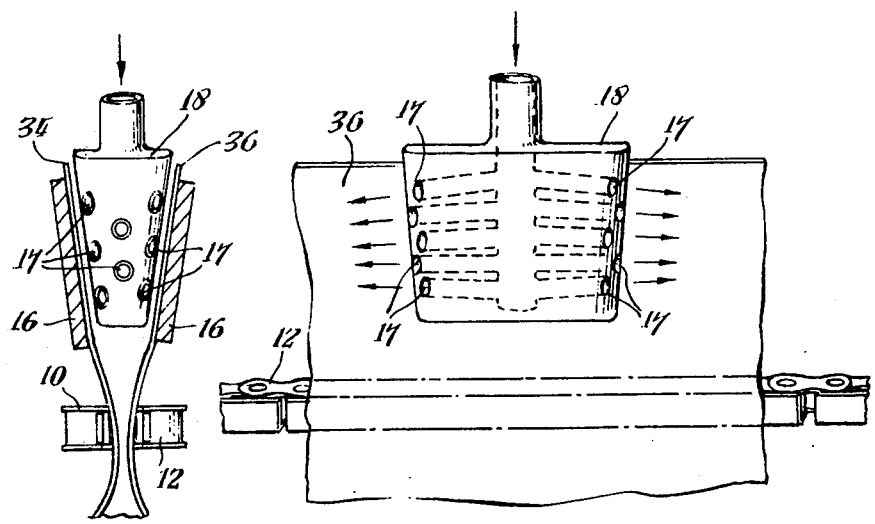
FIG. 5 shows a transverse cross-section through the sack mouth in the region of the nozzle.
FIG. 6 shows a longitudinal cross-section through the sack mouth in the region of the nozzle.

Referring now also to FIGS. 2 to 6; the mouth of a sack 32 is introduced between the chains 10, 12 at the beginning of their working run and is transported thereby through the machine. The sack comprises two opposite superimposed panels 35, 36 of heat-sealable film material, and the mouth of the sack projects upwardly a short way above the chains. The leading edge of the sack mouth trips the micro-switch 28, which starts the downward movement of the nozzle. As the mouth of the bag passes between the two suction devices 14, the two layers 34, 36 are drawn apart thereby, thus opening the mouth of the bag for the entry of the nozzle. This point is shown in FIG. 2. The nozzle stops in the vertical position within the open mouth of the bag and between the two external support plates 16, as shown in FIG. 3. Hot air is directed forwardly and rearwardly from nozzle openings 17 in the leading and trailing edges of the nozzle 18, as shown in FIGS. 5 and 6. The air from the leading openings impinges directly on the fold between the panels 34, 36 at the leading edge of the sack, so that sufficient heat is imparted into this difficult region. Sufficient hot air is provided to ensure a forceful circulation all around the nozzle, and if necessary additional openings are provided in the sides of the nozzle. This ensures that the inner surfaces of the panels obtain a sufficient quantity of heat in passing, and also that the panels are pressed against the support plates 16 and are kept out of contact with the hot nozzle 18. The heated regions of the panels pass between the nip rolls 24 and are thereby pressed together to effect the heat-seal. As the trailing edge of the bag passes the micro-switch 30, the switch restarts the movement of the nozzle so that, as indicated in FIG. 4, the nozzle moves forwardly and upwardly clear of the trailing edge of the bag. The trailing nozzle openings direct hot air into the fold in the trailing edge of the bag in just the same way as the leading nozzles do to the fold in the leading edge of the bag.

If the freshly heat-sealed film is insufficiently cooled by the nip rolls 24, additional cooling elements 26 can be provided, so that the seal is secure when it leaves the machine.

The hot air need not be issuing continuously from the nozzle 18; a simple rotary valve arrangement can be provided in the hot air conduit so that the hot air from the heater only passes to the nozzle when the nozzle moves downwardly into the heat-sealing position. The suction at 14 can be applied continuously, or could be linked to the movement of the nozzle 18 so as to be inoperative when the nozzle is in the raised position.

Two useful advantages are obtained by the present invention. Firstly, the hot air blowing can be used to effect a cleaning action on the inner surfaces of the sack. Secondly, since the hot air is applied directly to the surface to be heat-sealed, this process is very useful where relatively thick materials of poor thermal conductivity are to be heat-sealed together.

Figure 7:
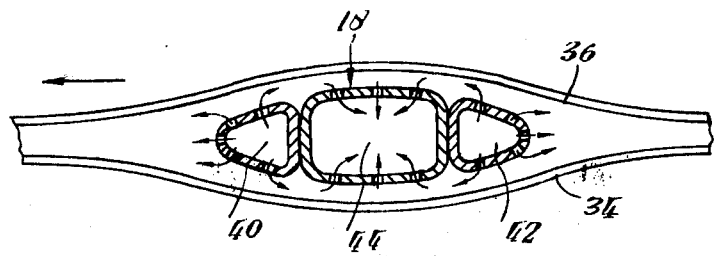
FIG. 7 shows a cross-section in plan through an alternative form of nozzle.

FIG. 7 shows diagrammatically an alternative construction of nozzle. In this form, the nozzle has three compartments; leading and trailing compartments 40, 42, and a central compartment 44. Each compartment has nozzles for the passage of air. The leading and trailing compartments are supplied with hot air for heat-sealing, while the central compartment is connected to a vacuum so as to apply suction to the inner surfaces of the sack. The central compartment therefore has to be appreciably wider than the leading and trailing compartments, so that the suction does not draw the surfaces of the sack into contact with the hot leading and trailing compartments. The purpose of this arrangement is to effect a more efficient cleaning of the inner surfaces of the sack mouth, by means of the vacuum action. Also, the vacuum section may help to control the flow of hot air around the nozzle.

I claim:

1. Apparatus for continuous heat-sealing the mouths of sacks, comprising means for transporting the sacks along a path with opposite sides of each sack at the mouth drawn together in superimposed relationship, suction means located on either side of the path for drawing the sides of the sack apart at the mouth, nozzle means located in the region of said suction means and arranged for movement into and out of the open mouth of each passing sack to direct heated gas therefrom onto the inner surfaces of the sack in the region to be heat-sealed, and means located on the path beyond the nozzle means for pressing the thus heated sides of the bag together at the mouth to effect the heat-seal between the two sides, the nozzle means having nozzle openings forwardly and rearwardly in the direction of travel of the sack such that, in operation, heated gas from the forward nozzle openings is directed into the leading fold of the sack as the nozzle enters the mouth, and heated gas from the rearward nozzle openings is directed into the trailing fold of the sack as the nozzle is removed from the mouth of the sack.

2. Apparatus for continuous heat-sealing the mouths of sacks, comprising means for transporting the sacks along a path with opposite sides of each sack at the mouth drawn together in superimposed relationship to each other, suction means located at either side of the path adapted to draw the sides of the sack apart at the mouth, nozzle means located in the region of said suction means and arranged for relative movement into and out of the open mouth of each passing sack to direct heated gas therefrom onto the inner surfaces of the sack in the region to be heat-sealed, lateral support means arranged on either side of the path to locate the sides of the sack mouth in closely spaced relationship to the sides of the nozzle when the nozzle is positioned in the sack mouth, and means located on the path beyond the nozzle means for pressing the sides of the bag thus heated together at the mouth to effect the heat-seal between the two sides.

3. Apparatus according to claim 2 wherein the nozzle means has nozzle openings forwardly and rearwardly with respect to the direction of travel of the sack such that the heated gas from the forward nozzle openings is directed into the leading fold of the sack as the nozzle enters the mouth, and heated gas from the rearward nozzle openings is directed into the trailing fold of the sack as the nozzle is removed from the mouth of the sack.

4. Apparatus according to claim 1 wherein the nozzle means comprises a nozzle rotatably mounted for movement into and out of the mouth of the sack as it moves along said path.

5. Apparatus according to claim 1 wherein the nozzle comprises apertured leading and trailing portions for directing hot gas forwardly and rearwardly with respect to the direction of travel of the sack, and an apertured intermediate portion to which suction is simultaneously applied to remove gas, and particulate matter, if present, from the heat seal region in the mouth of the sack.

6. A continuous method for heat sealing the mouths of sacks comprising the steps of:
   transporting each sack along a path with opposite sides at the mouth of each sack drawn together in superimposed relationship, the mouth having a leading fold, sides and a trailing fold;
   drawing the sides of the sack apart at the mouth by suction means located on either side of the path;
   moving a nozzle into and then out of the open mouth of the sack in passing, and directing heated gas from the nozzle into the leading fold of the sack mouth as the nozzle enters, onto the sides of the sack mouth while the nozzle remains stationary therein, and then into the trailing fold of the sack mouth as the nozzle is removed therefrom; and
   pressing the thus heated surfaces together to effect the heat-seal.

7. A method according to claim 6 wherein the sides of the sack mouth are externally supported in closely spaced relationship to the sides of the nozzle when the nozzle is stationary within the sack mouth.

* * * * *